(12) United States Patent
Maxam et al.

(10) Patent No.: US 9,514,310 B2
(45) Date of Patent: Dec. 6, 2016

(54) GAP SERVICES ROUTER (GSR)

(71) Applicant: TeleCommunication Systems, Inc., Annapolis, MD (US)

(72) Inventors: Ryan Maxam, Tampa, FL (US); Nicholas Kamensky, Tampa, FL (US); Matt Vincent, Tampa, FL (US); Doug Casto, Tampa, FL (US); Michael Joyce, Tampa, FL (US); Jeff West, Tampa, FL (US); Marty Buckley, Tampa, FL (US)

(73) Assignee: Telecommunication Systems, Inc., Annapolis, MD (US)

( * ) Notice: Subject to any disclaimer, the term of this patent is extended or adjusted under 35 U.S.C. 154(b) by 105 days.

(21) Appl. No.: 14/274,303

(22) Filed: May 9, 2014

(65) Prior Publication Data

US 2015/0058996 A1    Feb. 26, 2015

Related U.S. Application Data (60) Provisional application No. 61/821,422, filed on May 9, 2013.

(51) Int. Cl.
*G06F 21/60* (2013.01)
*H04L 12/931* (2013.01)
(Continued)

(52) U.S. Cl.
CPC ............. *G06F 21/60* (2013.01); *G06F 21/80* (2013.01); *G06F 21/86* (2013.01); *H04L 49/20* (2013.01);
(Continued)

(58) Field of Classification Search
CPC .......... G06F 21/60; G06F 21/80; G06F 21/86; G06F 2221/2143; H04L 49/20; H04L 49/351; H04L 49/40; H04L 45/583; H04L 45/60
See application file for complete search history.

(56) References Cited

U.S. PATENT DOCUMENTS 4,500,944 A   2/1985 Roberts
4,853,830 A   8/1989 Corfits
(Continued)

FOREIGN PATENT DOCUMENTS

EP   1076440   2/2001

OTHER PUBLICATIONS

TP-Link, "TL-WR743ND User Guide", 2012, TP-Link, p. I, 2-3, 134.*

(Continued)

*Primary Examiner* — Joseph P Hirl
*Assistant Examiner* — Stephen Gundry
(74) *Attorney, Agent, or Firm* — Tarolli, Sundheim, Covell & Tummino LLP (57) ABSTRACT

A gap services router (GSR) that is a drop-in replacement of an end of life Cisco™ 2811 integrated services router (ISR). The GSR is a routing, switching, and computing platform that provides a technology refresh in the same form factor as the legacy 2811 router. The GSR is one rack unit in size and comprises the latest routing and switching technology from Cisco™, preferably a Cisco™ 5915 embedded services router (ESR) and a Cisco™ embedded services 2020 switch. The GSR contains two WAN ports and twenty-five LAN ports, with power over ethernet capability on all ports. The GSR also optionally includes an embedded server module capable of running the latest virtualization technology. An embedded server module in the GSR includes a removable solid state drive (SSD) that is zeroed upon removal. The GSR is preferably used to replace 2811 ISRs integrated in deployed military equipment.

6 Claims, 8 Drawing Sheets

(51) Int. Cl.
*G06F 21/80* (2013.01)
*G06F 21/86* (2013.01)
*H04L 12/775* (2013.01)
*H04L 12/773* (2013.01)

(52) U.S. Cl.
CPC ............ *H04L 49/351* (2013.01); *H04L 49/40* (2013.01); *G06F 2221/2143* (2013.01); *H04L 45/583* (2013.01); *H04L 45/60* (2013.01)

(56) References Cited

U.S. PATENT DOCUMENTS

| | | | |
|---|---|---|---|
| 5,305,377 A | 4/1994 | D'Arcy | |
| 5,553,146 A | 9/1996 | Flake | |
| 5,562,695 A | 10/1996 | Obenchain | |
| 5,652,695 A | 7/1997 | Schmitt | |
| 5,982,888 A | 11/1999 | Luckeneder | |
| 5,991,293 A | 11/1999 | Buchanan et al. | |
| 6,118,768 A | 9/2000 | Bhatia | |
| 6,144,667 A | 11/2000 | Doshi | |
| 6,275,573 B1 | 8/2001 | Naor et al. | |
| 6,282,204 B1 | 8/2001 | Balatoni | |
| 6,415,329 B1 | 7/2002 | Gelman | |
| 6,496,867 B1 | 12/2002 | Beser | |
| 6,549,229 B1 | 4/2003 | Kirby et al. | |
| 6,640,248 B1 | 10/2003 | Jorgensen | |
| 6,661,677 B1 | 12/2003 | Rumney | |
| 6,700,694 B2 | 3/2004 | Zou | |
| 6,700,964 B2 | 3/2004 | Schmid et al. | |
| 6,735,081 B1 | 5/2004 | Bishop | |
| 6,766,451 B1 | 7/2004 | Van Rijnsoever | |
| 6,792,615 B1 | 9/2004 | Rowe et al. | |
| 6,804,776 B1 | 10/2004 | Lothberg et al. | |
| 6,954,520 B1 | 10/2005 | Lang | |
| 6,978,308 B2 | 12/2005 | Boden | |
| 7,023,818 B1 | 4/2006 | Elliott | |
| 7,023,996 B2 | 4/2006 | Stephenson | |
| 7,184,550 B2 | 2/2007 | Graunke | |
| 7,236,455 B1 | 6/2007 | Proudler | |
| 7,248,475 B2 | 7/2007 | Paydar | |
| 7,436,660 B2 | 10/2008 | Pedoeem | |
| 7,461,249 B1 | 12/2008 | Pearson et al. | |
| 7,467,290 B2* | 12/2008 | Chen | G06F 9/4401 713/1 |
| 7,573,713 B2 | 8/2009 | Hoffman | |
| 8,959,182 B1* | 2/2015 | Anderson | G06F 21/6245 709/217 |
| 2001/0003846 A1 | 6/2001 | Rowe | |
| 2002/0004898 A1 | 1/2002 | Droge | |
| 2002/0009060 A1 | 1/2002 | Gross | |
| 2002/0010866 A1 | 1/2002 | McCullough | |
| 2002/0031126 A1 | 3/2002 | Crichton | |
| 2002/0059516 A1 | 5/2002 | Turtiainen | |
| 2002/0161929 A1* | 10/2002 | Longerbeam | H04L 45/583 709/250 |
| 2003/0121047 A1 | 6/2003 | Watson | |
| 2003/0128696 A1 | 7/2003 | Wengrovitz | |
| 2003/0235209 A1 | 12/2003 | Garg et al. | |
| 2004/0153643 A1 | 8/2004 | Correll | |
| 2005/0078422 A1* | 4/2005 | Pincu | G06F 1/263 361/62 |
| 2005/0193182 A1* | 9/2005 | Anderson | G06F 21/80 711/163 |
| 2006/0104230 A1* | 5/2006 | Gidwani | H04W 84/00 370/328 |
| 2009/0150631 A1* | 6/2009 | Wilsey | G06F 12/1408 711/163 |
| 2009/0175254 A1* | 7/2009 | Casto | H04L 12/4625 370/338 |
| 2009/0182845 A1* | 7/2009 | Johnson | H04L 45/00 709/219 |
| 2009/0189981 A1* | 7/2009 | Siann | H04N 7/183 348/143 |
| 2010/0031349 A1* | 2/2010 | Bingham | G06F 21/31 726/20 |
| 2010/0260157 A1* | 10/2010 | Buchholz | H04W 84/10 370/338 |
| 2012/0047582 A1* | 2/2012 | Chan | G06F 21/60 726/26 |
| 2012/0113265 A1* | 5/2012 | Galvin | H04N 5/23206 348/159 |
| 2012/0151121 A1* | 6/2012 | Braga | G06F 21/79 711/103 |
| 2012/0224337 A1* | 9/2012 | Bodine | H04B 1/3888 361/752 |
| 2013/0107041 A1* | 5/2013 | Norem | H04N 5/225 348/143 |
| 2013/0254439 A1* | 9/2013 | Sundaravel | G06F 13/12 710/62 |
| 2014/0130188 A1* | 5/2014 | Baryudin | G06F 21/78 726/29 |
| 2014/0283146 A1* | 9/2014 | Obukhov | G06F 21/87 726/34 |

OTHER PUBLICATIONS

Cisco, "Cryptographic Module Security Policy for the Cisco 1905, Cisco 1921, Cisco 1941, Cisco 2901, Cisco 2911, and Cisco 2921 Integrated Services Routers (ISRs)", Jul. 2011, Version 0.12, Cisco, p. 1, 4, 8-9, 27-30.*
Cisco, "Cisco 2900 Series Integrated Service Routers Data Sheet", Cisco, 2014, p. 1-15.*
Cisco, Cisco Series Integrated Services Routers, 2006, Cisco, p. 1, 13.*
Dtech Labs, M3-PM-RTR3C Product Sheet, Apr. 2015, Dtech Labs, pp. 1.*
http://www.ietf.org/rfc/rfc406.txt, retrieved date Nov. 20, 2008.
Mykrotronix, "KIV-7 Embeddable KG-84 COMSEC Module," Jul. 1, 1998, pp. 1-2.
International Search Report received in PCT/US2011/001295 dated Nov. 25, 2011.
"ViaSat KIV-21 Internet Protocol Crypto Receives National Security Agency Certification." ViaSat website. Accessed Jan. 31, 2011. Article published on May 10, 2000.
International Search Report received in PCT/US2004/42365 dated Jun. 30, 2006.
Dtech Labs, Inc., Dwyer, James, Protest Under 37 CFR 1.291, Jun. 2007, pp. 1-19.
Mykotronx, KIV-7 Embeddable KG-84 Comsec Module, Jul. 1998, pp. 1-2.
Granite Island Group, Secure Telephone Units, Crypto Key Generators, Encryption Equipment, and Scramblers, Technical Surveillance Counter Measures, 2002, pp. 1-57.
L-3 Communications OMNI Secure Terminal Receives National Security Agency-NSA-Certification, Jun. 12, 2002, See for instance capabilities, Ret. Date Oct. 10, 2009.
Lin, Tzung-Pao; "Switch Access Architecture for Quad Voice Lines with Data On-Demand per ISDN BRI"; Apr. 1989; IEEE; Infocom '89, pp. 647-654.
Nortel Network, Securing Voice accorss the Internet retrieved date May 5, 2008 http://www.nortel.com/products/01/contivity/collateral/nn101720-0902.pdf 2002.
Cisco Systems, CISCO 1751 Modular Access Router, 1992-2003, pp. 1-19.

* cited by examiner

GAP SERVICES ROUTER (GSR)

The present invention claims priority from U.S. Provisional No. 61/821,422, filed May 9, 2013, entitled "Gap Services Router (GSR)", the entirety of which is expressly incorporated herein by reference.

BACKGROUND OF THE INVENTION

1. Field of the Invention

This invention relates generally to telecommunications, and more particularly to network communications, and data center communications.

2. Background of Related Art

An equipment case is used to protect encased equipment against environmental factors and damage due to shock, etc. A conventional rack case is an equipment case with a rack (typically a standardized 19 inch rack) mounted to the inside for protection of rack-mounted equipment, e.g., rack-mountable servers, routers, switches, etc. A rack case is ruggedized to protect internal equipment from physical damage and environmental factors such as rain, harsh temperatures, etc.

A rack case typically includes a standardized rack frame for mounting of rack-mountable equipment. The height of each piece of equipment mounted in a rack case must be a multiple of a rack unit (RU). One rack unit (RU) is equivalent to 1.75 inches. The width of a piece of equipment mounted in a rack case must be 19 inches wide (if the rack case encompasses a 19 inch rack). A standardized 19 inch rack is widely used for storing technical equipment, such as computer equipment, network equipment, etc.

Rack cases able to withstand harsh environments are widely used in military/department of defense (DoD) applications. For example, a military unit may use a rack case to store portable networking equipment at a remote location. Moreover, equipment mounted in a rack case may be used to set up communications networks for receipt/delivery of mission critical information. Portable/deployable communications products are typically integrated into a smallest practical package to meet the needs of military personnel on remote assignment.

Cisco™ has manufactured a rack mountable 2811 integrated services router (ISR) that is 1 rack unit (RU) in size (i.e. 1.75 inches tall).

Figure 6:
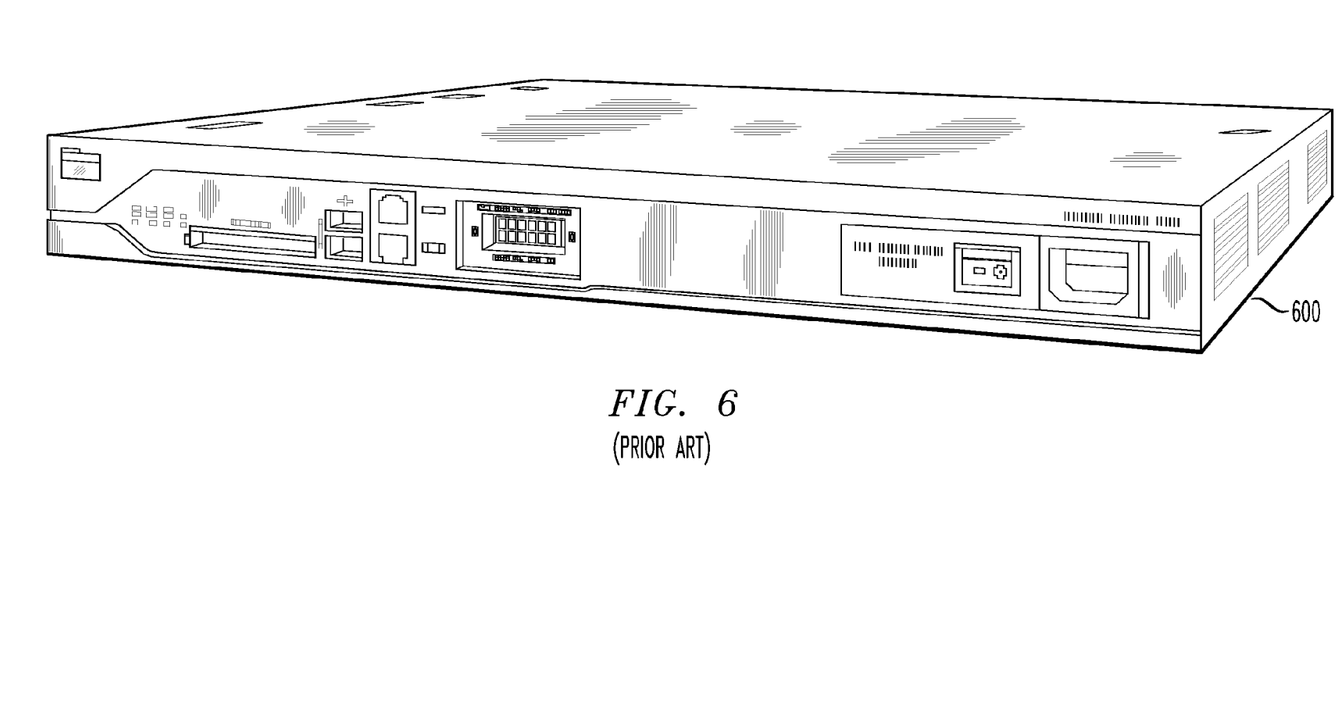
FIG. 6 depicts a conventional Cisco™ 2811 integrated services router (ISR).

FIG. 6 depicts a conventional Cisco™ 2811 integrated services router (ISR).

The 2811 integrated services router (ISR) 600 is currently deployed in thousands of telecommunications systems, e.g., department of defense (DoD) systems, commercial systems, etc. However, the Cisco™ 2811 integrated services router (ISR) 600 has been discontinued and is not being replaced with a similarly sized suitable product.

Cisco™ has developed a 2911 integrated services router (ISR) to replace the end of life (EoL) 2811 integrated services router (ISR) 600. However, the 2911 integrated services router (ISR) (and other commercially available suitable replacement routers) has a height of 2 rack units (RU) and thus does not fit in the one rack unit (RU) space previously/currently occupied by the 2811 integrated services router (ISR) 600.

SUMMARY

A drop-in replacement of an end of life (EoL) Cisco™ 2811 integrated services router (ISR) comprises a gap services router (GSR). In accordance with the principles of the present invention, a gap services router (GSR) is a routing, switching, and computing platform that provides a technology refresh in the same form factor as the discontinued 2811 integrated services router (ISR).

In accordance with the principles of the present invention, the inventive gap services router (GSR) is one rack unit (RU) in size and comprises the latest routing and switching technology from Cisco™, preferably a Cisco™ 5915 embedded services router (ESR) and a Cisco™ embedded services 2020 switch. The gap services router (GSR) additionally includes two wide area network (WAN) ports and twenty-five local area network (LAN) ports, all featuring power over ethernet (PoE) capability.

In accordance with the principles of the present invention, the inventive gap services router (GSR) also optionally includes an embedded server module capable of hosting various virtual machines. An embedded server module in a gap services router (GSR) may be used to provide services/applications previously provided by external dedicated computing platforms. By enabling server capabilities on the inventive gap services router (GSR), the gap services router (GSR) may effectively eliminate need for external dedicated computing platforms and thus effectively reduce the overall size of system equipment.

A server in a gap services router (GSR) comprises a removable solid state drive (SSD) (or hard drive) which serves as the brains of the server. Removal of a solid state drive (SSD) from a server in a gap services router (GSR) causes the solid state drive (SSD) to zero out. In a preferred embodiment, a server in a gap services router (GSR) also zeroes out (e.g., any files, documents, etc., stored on the server is purged) upon removal of the solid state drive (SSD). Once a solid state drive (SSD) is removed from a server in a gap services router (GSR), the gap services router (GSR) proceeds to act as a 'dumb' router (i.e. a traditional router, a router with no embedded server).

The inventive gap services router (GSR) is preferably used to replace end of life (EoL) Cisco™ 2811 integrated services routers (ISR) implemented in deployed military equipment. The inventive gap services router (GSR) comprises newer technology, greater performance, and higher port density than the legacy Cisco™ 2811 integrated services router (ISR) and enables customers to replace the 2811 integrated services router (ISR) without alteration/modification to existing network equipment.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a gap services router (GSR) to serve as a physical drop-in replacement of an end of life (EoL) Cisco™ 2811 integrated services router (ISR). The inventive gap services router (GSR) replaces the unsupported Cisco™ 2811 integrated services router (ISR) with newer technology, greater performance, and higher port density.

Cisco™ has manufactured a 2811 integrated services router (ISR) that is 1 rack unit (RU) in size (1.75 inches tall). The Cisco™ 2811 integrated services router (ISR) has been deployed in millions of networking solutions since its' launch but has since reached its' end of life (EoL) and end of sale (EoS). Cisco™ has engineered a 2911 integrated services router (ISR) to replace the discontinued 2811 integrated services router (ISR). However, the 2911 integrated services router (ISR) is 2 rack units (RU) in size (twice the height of the legacy 2811 integrated services router (ISR)) and thus not able to fit in the 1 rack unit (RU) mount space previously/currently occupied by the legacy 2811 router. The present inventors have realized that to utilize the new 2911 integrated services router (ISR), all deployed transit cased systems/products currently housing the 2811 integrated services router (ISR) have to be redesigned.

Increased sizing of the replacement 2911 integrated services router (ISR) is detrimental to existing US military systems/applications, which have been designed and delivered to be as small as possible. Such systems do not contain room for a router twice the height (2 rack units (RU)) of the legacy 2811 integrated services router (ISR).

The US Army currently maintains thousands of compact, ruggedized transit cased systems comprising the Cisco™ 2811 integrated services router (ISR). To incorporate the new 2911 integrated services router (ISR) in such systems, owners of such systems will have to invest in modified/new equipment housing.

The inventive gap services router (GSR) is a one rack unit (RU) (1.75 inch tall) technology refresh option designed to fit in the same rack unit space as the legacy 2811 integrated services router (ISR). Unlike the 2 rack unit (RU) Cisco™ 2911 integrated services router (ISR), the 1 rack unit (RU) gap services router (GSR) enables users to upgrade system technology without additional rack space or equipment retrofitting. The inventive gap services router (GSR) offers enhanced routing capabilities in the same form factor (i.e. same fit and size) as the end of life (EoL) 2811 integrated services router (ISR).

In accordance with the principles of the present invention, the inventive gap services router (GSR) is a Cisco™ based routing, switching, and computing appliance that can be used as a form, fit, and function replacement of the end of life (EoL) Cisco2811 integrated services router (ISR).

Figure 1:
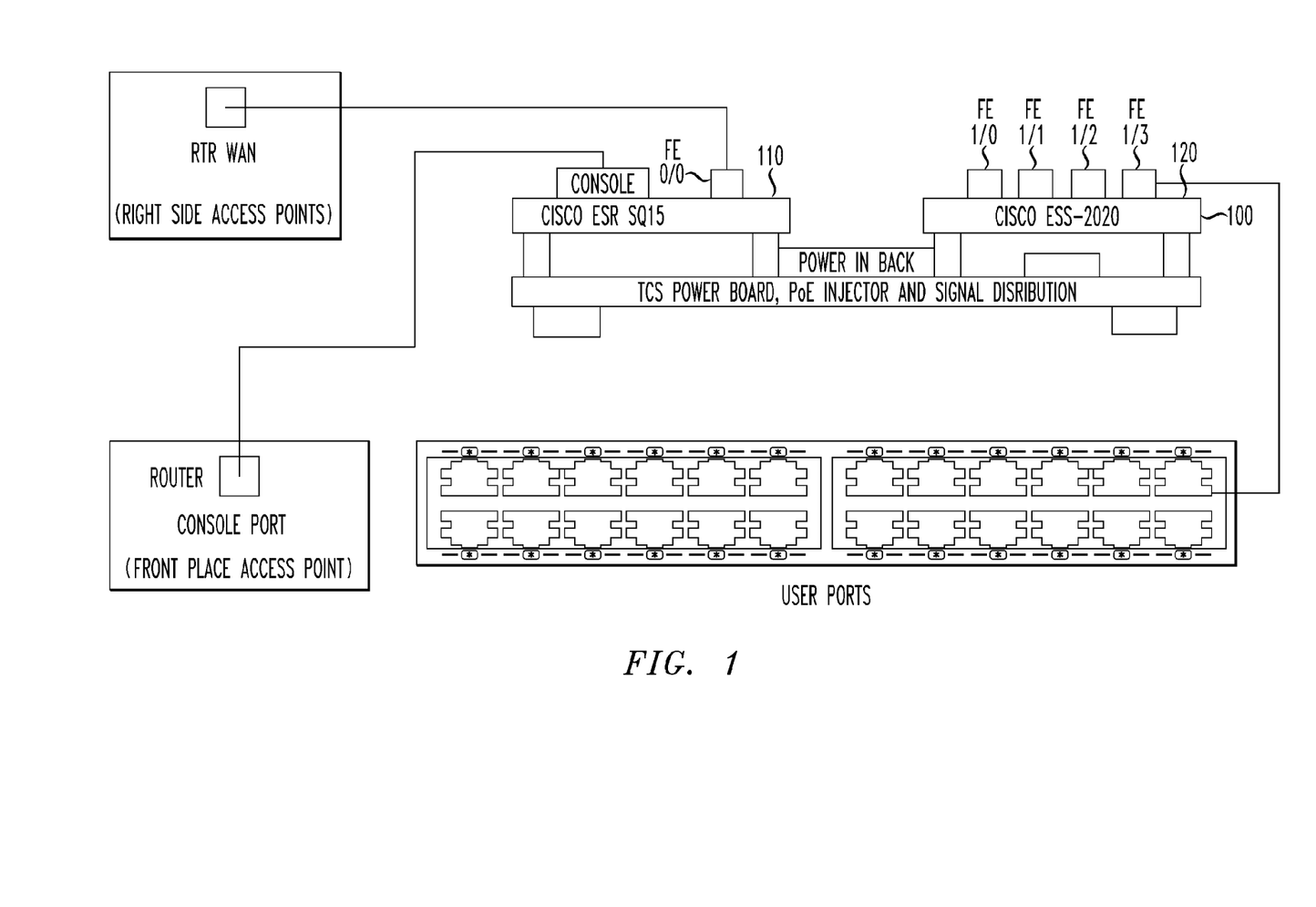
FIG. 1 shows the layout of a gap services router (GSR) in accordance with the principles of the present invention.

FIG. 1 shows a layout of an exemplary gap services router (GSR), in accordance with the principles of the present invention.

As portrayed in FIG. 1, the inventive gap services router (GSR) 100 incorporates the latest routing and switching technology from Cisco™, preferably a Cisco™ 5915 embedded services router (ESR) 110 (the latest small rugged router from Cisco™) and a Cisco™ embedded services 2020 switch 120. The inventive gap services router (GSR) 100 also preferably includes a power over ethernet (PoE) linear tech chip set and an optional single-board computer based server module, capable of running the latest virtualization technology.

Figure 2:
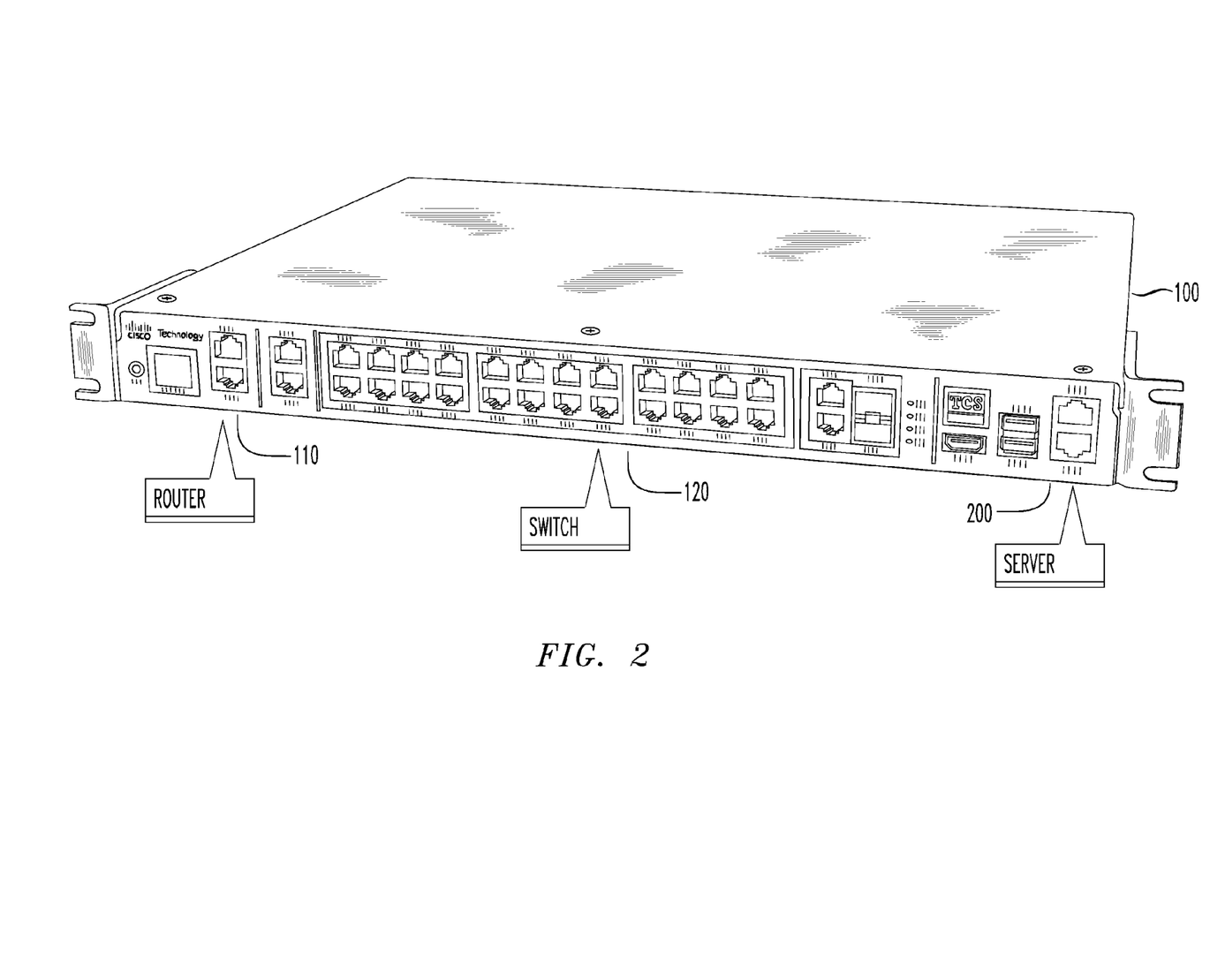
FIG. 2 shows a physical embodiment of the gap services router (GSR), in accordance with the principles of the present invention.

FIG. 2 shows a physical embodiment of the gap services router (GSR), in accordance with the principles of the present invention. As depicted in FIG. 2, the inventive gap services router (GSR) 100 includes routing 110, switching 120, and server 200 capabilities, and is improved by innovations in design, power, and packaging.

Figure 3:
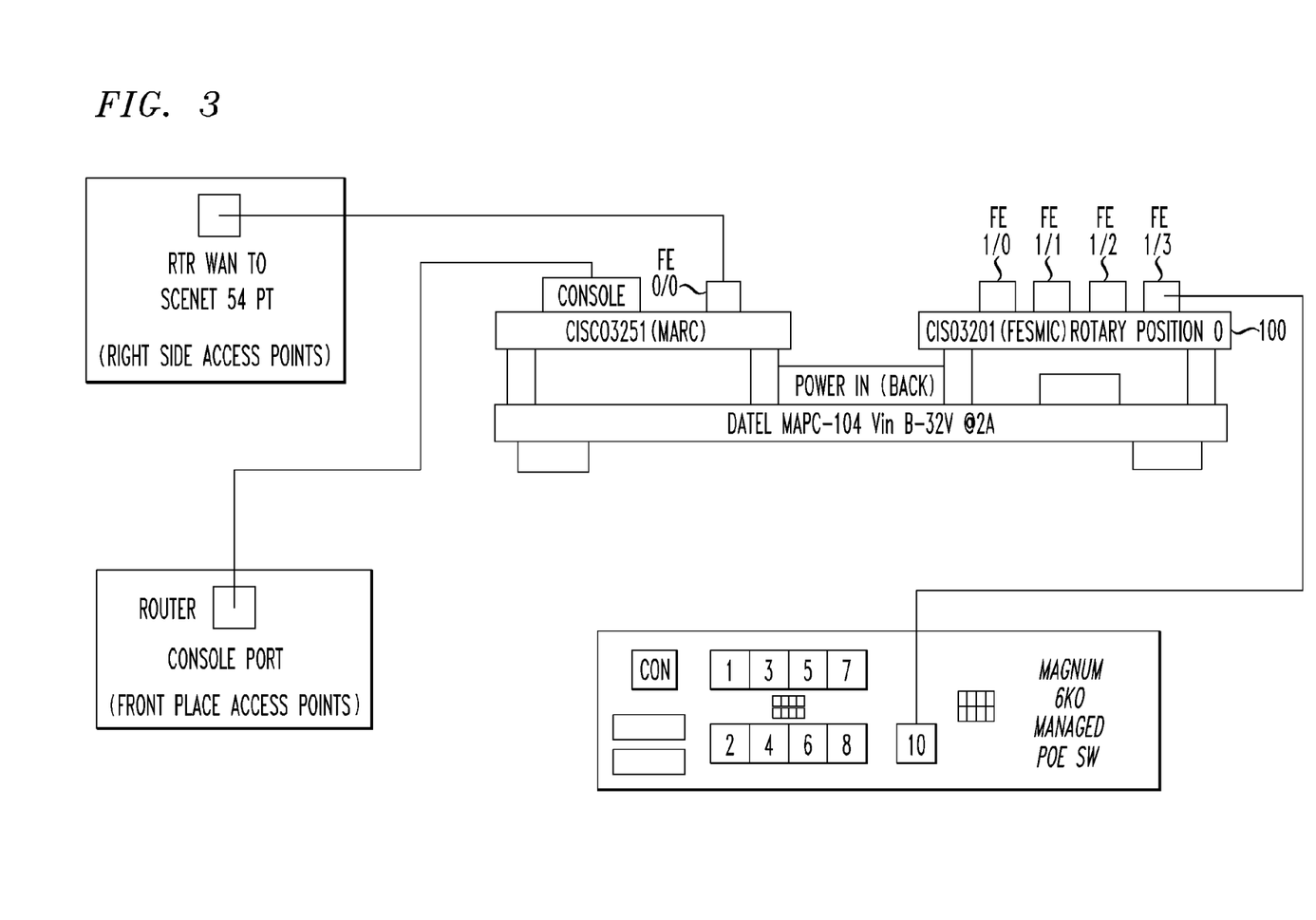
FIG. 3 shows an alternate layout of an exemplary gap services router (GSR), in accordance with the principles of the present invention.

FIG. 3 shows an alternate layout of an exemplary gap services router (GSR), in accordance with the principles of the present invention. In accordance with the principles of the present invention, the inventive gap services router (GSR) 100 preferably includes: two wide area network (WAN) ports, twenty-five local area network (LAN) ports, power over ethernet (PoE) capability (i.e. power and data are passed over ethernet cables) on all ports, high environmentals (the gap services router (GSR) is MIL-STD-810G compliant), and a compact, lightweight form factor (only 13.5 inches deep) for seamless integration into existing network solutions.

The inventive gap services router (GSR) 100 also preferably provides: unified communications with Cisco™ unified communications express, and support for up to 48 devices; wide area network optimization and acceleration with Cisco™ wide area application services (WAAS express) and internet protocol (IP) multiplexing; radio aware routing with dynamic link exchange protocol (DLEP), RFC5578, and radio to router control (R2RC) protocol; and security, with embedded hardware-accelerated virtual private network (VPN) encryption, an internetwork operating system (IOS) based firewall, an intrusion prevention system (IPS), IOS based content filtering, a federal information processing standards (FIPS) 140-2 certified advanced encryption standard (AES), and suite B. The inventive gap services router (GSR) 100 also preferably includes an optional ear and mouth (E&M) interface.

The inventive gap services router (GSR) 100 fits into any 19 inch rack mount shelf, e.g., a 19 inch rugged shock mount transit case such as those provided by Ameripack or ECS. The inventive gap services router (GSR) 100 is preferably 19"×1.75"×13" and incorporates new innovations in packing, power, form factor, and overall design. Size, weight, and power (SWaP) were integral factors in the development of the inventive gap services router (GSR) 100.

The gap services router (GSR) 100 boasts high reliability in harsh environments and may be used to meet the needs of military personnel while on remote assignment. Server 200 capabilities on the inventive gap services router (GSR) 100 may be used to reduce the amount of investment, training, maintenance, and physical footprint (i.e. amount of space the hardware occupies) traditionally required when server capabilities are provided via external dedicated computing platforms.

Table 1 depicts a technical comparison of the inventive gap services router (GSR) 100 and the legacy Cisco™ 2811 integrated services router (ISR).

TABLE 1

| Description | Gap Services Router | Cisco 2811 |
|---|---|---|
| Technology Base | | |
| Router | 5915 | 2811 |
| Switch | Cisco ESS 2020 Physical | NME - 16 |

TABLE 1-continued

| Description | Gap Services Router | Cisco 2811 |
|---|---|---|
| Rackmount | Yes | Yes |
| Dimensions | 1.72 × 17.5 × 13.5 in. | 1.72 × 17.5 × 16.5 in. |
| Rack Units | 1 RU | 1 RU |
| Weight | <10 lbs | 13.7 lbs |
| Power | | |
| Processing Power | Core2Duo/ i7 Quad Core | 1.0 GHz Intel Pentium |
| AC Input Voltage | 100 to 240 VAC | 100 to 240 VAC |
| Throughput (clear text) | 197 Mbps | 98 Mbps |
| Temperature | | |
| Operational | −20° to 149° F. (−28° to 65° C.) | 32° to 104° F. (0° to 40° C.) |
| Storage | −20° to 185° F. (−28° to 85° C.) | −4° to 149° F. (−20° to 65° C.) |
| Networking | | |
| LAN Ports | 25 (All PoE) | 16 |
| WAN Ports | 2 | 2 |
| Fiber | Yes | No |
| GigE | Yes | No |
| Interface Options | | |
| E&M | Yes | Yes |
| FXS | Yes | Yes |
| Serial | Yes | Yes |
| Server | optional | no |
| CPU | Up to Intel i7, Quad Core | |
| Memory | Up to 16 GB | |
| Hard Drive | Up to 1 TB (Removable) | |

As detailed in Table 1, the inventive gap services router (GSR) 100 uses a conventional Cisco™ 5915 router 110 in place of an end of life (EoL) Cisco™ 2811 integrated services router (ISR), and a Cisco™ embedded services 2020 switch 120 in place of an NME-16 switch incorporated in the 2811 integrated services router (ISR).

A Cisco™ 5915 embedded services router (ESR) 110 integrated in the inventive gap services router (GSR) 100 is preferably federal information processing standards (FIPS) 140-2 certified, suite B capable, with power over ethernet (PoE) capability on all ports. Additional information regarding the Cisco™ 5915 embedded services router (ESR) 110 can be found at www.cisco.com/c/dam/en/us/products/collateral/routers/5900-series-embedded-services-routers/aag-c45-680066.pdf.

A Cisco™ embedded services 2020 switch 120 integrated in the inventive gap services router (GSR) 100 is preferably internetwork operating system (IOS) based with 25 power over ethernet (PoE) ports. Additional information regarding the Cisco™ embedded services 2020 switch 120 can be found.

As shown in Table 1, the inventive gap services router (GSR) 100 is slightly smaller (1.72×17.15×13.5 in) and lighter (<10 pounds) than the Cisco™ 2811 integrated services router (ISR) and boasts improved environmentals (−20° F. to 149° F. degrees operational and −20° F. to 185° F. storage). The inventive gap services router (GSR) 100 provides a greater number of ports (all of which include power over ethernet (PoE) capability) and also features integrated server capabilities, whereas the legacy Cisco™ 2811 integrated services router (ISR) does not.

The gap services router (GSR) 100 preferably has core 2 duo/i7 quad core processing power as opposed to the 1.0 GHz Intel(TM) pentium core processing power implemented on the 2811 integrated services router (ISR). The gap services router (GSR) 100 provides 2 times the throughput of the Cisco™ 2811 integrated services router (ISR) and significantly exceeds any existing 2811 throughput requirements.

Table 2 depicts a technical comparison of the inventive gap services router (GSR) 100, the legacy Cisco™ 2811 integrated services router (ISR), and the replacement Cisco™ 2911 integrated services router (ISR).

| Description | Gap Services Router (GSR) | Cisco ™ 2811 ISR (EoL) | Cisco ™ 2911 ISR |
|---|---|---|---|
| Router | Cisco ™ ESR 5915 | 2811 | 2911 |
| Rack Units | 1 RU | 1 RU | 2 RU |
| Weight | 9.1 lb | 13.7 lb | 21 lb |
| Size | 1.72 × 17.5 × 13.5 | 1.72 × 17.5 × 16.5 | 3.5 × 17.5 × 12 |
| Temperature (OP) | −20° to 149° F. (−28° to 65° C.) | 32° to 104° F. (0° to 40° C.) | 32° to 104° F. (0°to 40° C.) |
| Processing Power | i7 Quad Core | 1.0 GHz Intel Pentium | Intel Xeon 64-Bit Blade Server |
| Switch | Cisco ESS-2020 | NME -16 | NME |
| Switch ports | 25 PoE 2 GigE (Fiber or RJ45) | 16 | 24 |
| Throughput (cleartext) | 197 Mpbs | 98 Mbps | 370 Mbps |
| Server | Yes | No | No |

As depicted in Table 2, the Cisco™ 2911 integrated services router (ISR) is heavier and larger than both the inventive gap services router (GSR) 100 and the legacy 2811 integrated services router (ISR). The 2911 integrated services router (ISR) has the same environmentals as the legacy 2811 integrated services router (which are inferior to those of the inventive gap services router (GSR)) and no server capabilities.

In accordance with the principles of the present invention, the inventive gap services router (GSR) 100 is available in two configurations: a router/switch configuration and a router/switch/server configuration. The router/switch configuration includes a 19 inch rack mount, a router 110, a switch 120, and an optional field or factory server upgrade with removable solid state drive (SSD). The router/switch/server configuration includes a 19 inch rack mount, a modular router 110, a modular switch 120, and a modular server 200 with removable solid state drive (SSD).

In accordance with the principles of the present invention, an optional server module 200 embedded in the gap services router (GSR) 100 preferably incorporates an Intel(TM) core 2 duo (2.26 GHz) or quad core i7 processor, 8 GB of double data rate type 3 (DDR3) memory, up to 1 terabyte (TB) of removable solid state drive (SSD) (or hard drive), and an optional VMWare(TM) ESXi 5.0 virtualization platform or linux operating system. Virtualization capabilities on the embedded server 200 preferably include: internet protocol (IP) acceleration capabilities (e.g. riverbed virtual steelhead), virtual call processing capabilities (e.g., CISCO™ unified communications manager), virtual network management capabilities/network operations (NETOPS) capabilities, radio over Internet protocol (RoIP) capabilities, and other virtualization capabilities (e.g. uplogix local manager).

A server 200 embedded in the gap services router (GSR) 100 also preferably includes a removable solid state drive (SSD) (or hard drive), which acts as the brains of the server 200. Removal of a solid state drive (SSD) (or pressing of a button, entering of a sequence, etc., to initiate zeroing out) from a server 200 embedded in the gap services router (GSR) 100 initiates a clean swipe of all data maintained on the solid state drive (SSD) and/or server 200. In particular, when the solid state drive (SSD) is removed from the server 200, the solid state drive (SSD) is zeroed out (i.e. all memory is purged) and the router subsequently acts as a 'dumb' router (i.e., a traditional router, a router with no server 200).

In a preferred embodiment, all data (e.g. files, documents, etc.) stored on a server 200 embedded in the gap services router (GSR) 100 is additionally wiped/purged upon removal of a solid state drive (SSD) from that server 200. A solid state drive (SSD) may be removed from a server 200 embedded in a gap services router (GSR) 100 for security purposes and/or for enhanced system performance/reduced power consumption.

Server 200 capabilities on the inventive gap services router (GSR) 100 may effectively eliminate need for external dedicated computing platforms and thus effectively reduce the overall size of system equipment.

For example, one major problem affecting deployed communications equipment is delay caused by satellite connections. Currently, dedicated one rack unit (RU) network appliances, such as wide area network (WAN) accelerators, are used to help minimize such delay.

In accordance with the principles of the present invention, a server module 200 in the inventive gap services router (GSR) 100 is capable of running wide area network (WAN) software, such as wide area network (WAN) accelerators in a virtual machine, and can thus be used to help minimize delay without use of additional network appliances. Replacing dedicated network appliances with gap services router (GSR) 100 server capabilities may lead to dramatic reduction in overall system operational costs, weight, space, and power consumption.

Figure 4:
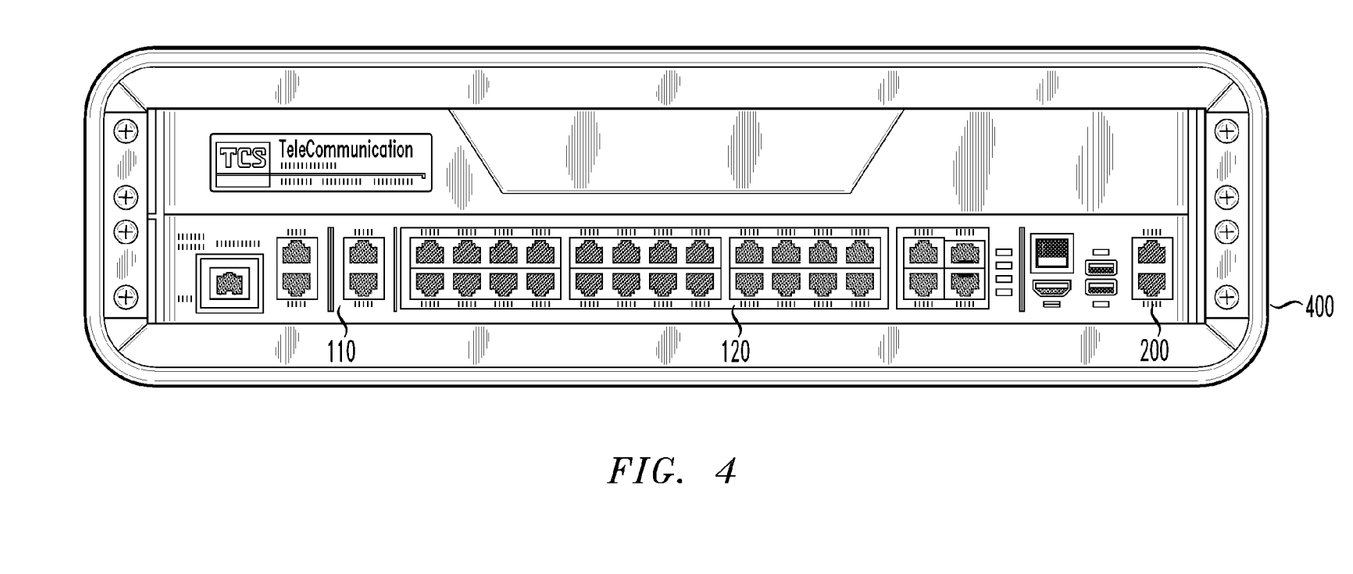
FIG. 4 depicts an exemplary gap services router (GSR) network enclave, in accordance with the principles of the present invention.
Figure 5A:
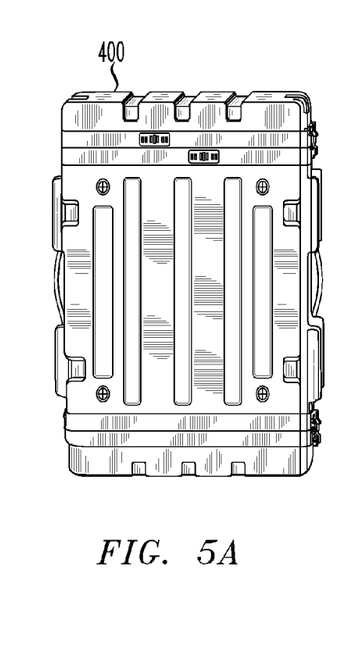
FIGS. 5a to 5f portray the size of an exemplary network enclave comprising a gap services router (GSR) and a conventional network enclave comprising a Cisco™ 2811 integrated services router (ISR), in accordance with the principles of the present invention.
Figure 5B:
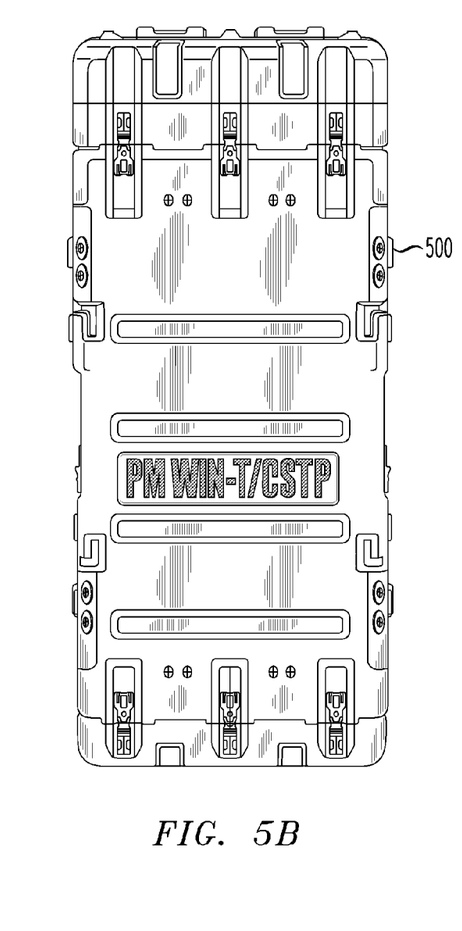
Figure 5C:
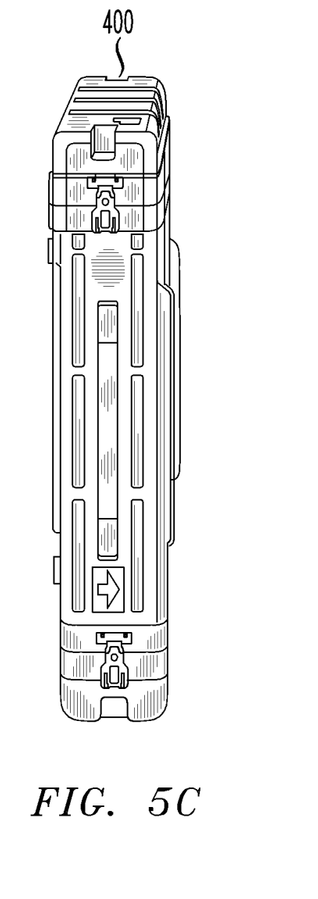
Figure 5D:
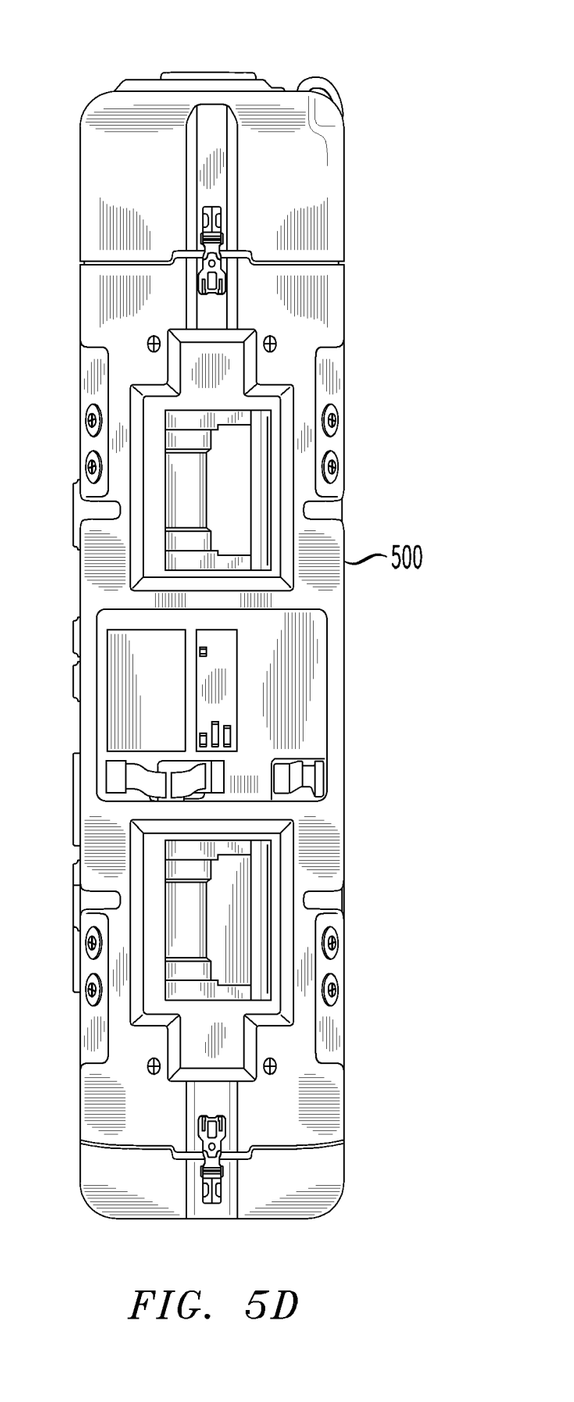
Figure 5E:
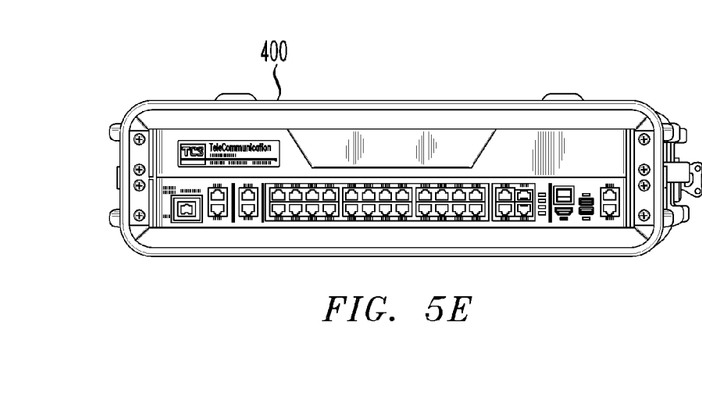
Figure 5F:
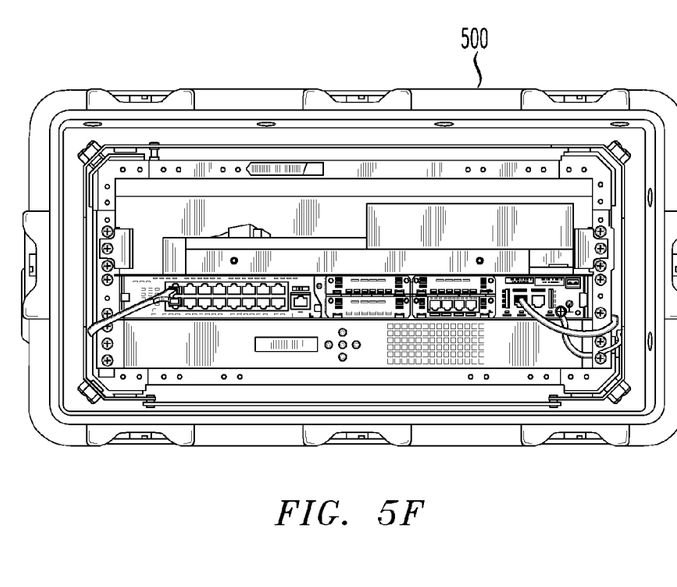

FIG. 4 depicts an exemplary gap services router (GSR) network enclave, in accordance with the principles of the present invention.

As depicted in FIG. 4, a network enclave 400 incorporating a gap services router (GSR) 100 has a highly capable, small form factor, and preferably includes a Cisco™ 5915 router 110, a Cisco™ 2020 switch 120, an integrated rugged server 200, and a national security agency (NSA) 1 inline encryptor. The inventive gap services router (GSR) network enclave 400 preferably provides routing, switching, and computing capabilities required to add standards-based and common capabilities to joint, coalition, and civil support partners. The gap services router (GSR) network enclave 400 can be placed in US and Coalition partners tactical operations centers to quickly provide a common network for command and control between US forces and partners.

FIGS. 5a to 5f portray the size of an exemplary network enclave comprising a gap services router (GSR) and a conventional network enclave comprising a Cisco™ 2811 integrated services router (ISR), in accordance with the principles of the present invention.

As depicted in FIGS. 5a to 5f, a network enclave 400 incorporating a gap services router (GSR) 100 is significantly smaller than a network enclave 500 incorporating a Cisco™ 2811 integrated services router (ISR). A gap services router (GSR) enclave 400 is preferably 22 pounds with dimensions: 20" L, 21" W, 5.5" H, whereas the legacy enclave 500 is typically 110 pounds with dimensions: 38" L, 24" W, 13" H.

Table 3 portrays power consumption of a network enclave comprising a gap services router (GSR) and an embedded router, and a network enclave comprising a legacy 2811 integrated services router (ISR) and a wide area network (WAN) accelerator, in accordance with the principles of the present invention.

TABLE 3

| | Current Draw (amps) | Power Draw (Watts) |
|---|---|---|
| GSR enclave: | .4 Amp@120 VAC continuous | 48 Watts |
| GSR switch and router | .2 Amp@120 VAC continuous | 24 Watts |
| GSR embedded server (running VM acceleration) | .2 Amp@120 VAC continuous | 24 Watts |
| Baseline (legacy) enclave: | .9 Amp@120 VAC continuous | 108 Watts |
| Cisco ™ 2811 ISR (w/NME 16) | .4 Amp@120 VAC continuous | 48 Watts |
| Citrix WANSCALER | .5 Amp@120 VAC continuous | 60 Watts |

As depicted in Table 3, with no load, a network enclave 400 comprising a gap services router (GSR) 100 and an embedded server 200 has a power draw of 48 Watts. At max load (28 power over ethernet (PoE) IP phones), the network enclave 400 with a gap services router (GSR) 100 and embedded server 200 has a power draw of 180 Watts.

Alternatively, as shown in Table 3, with no load, a network enclave 500 comprising a legacy 2811 integrated services router (ISR) and external wide area network (WAN) accelerator has a power draw of 108 Watts. At max load (12 power over ethernet (PoE) IP phones), the network enclave 500 with a 2811 integrated services router (ISR) and wide area network (WAN) accelerator has a power draw of 216 Watts.

In accordance with the principles of the present invention, a gap services router (GSR) enclave 400 can service 15 more power over ethernet (PoE) IP phones at 36 Watts less draw than a 2811 integrated services router (ISR) enclave 500.

The inventive gap services router (GSR) 100 features a size, weight, and operating temperature advantage over the Cisco™ 2811 integrated services router (ISR). The inventive gap services router (GSR) 100 is also very versatile, as it is both sleek enough for commercial applications and durable enough for deployed department of defense (DoD) applications.

The gap services router (GSR) 100 is an ideal solution for any application in need of a 1 rack unit (RU) system with router 110, switch 120, and optional server 200 capabilities. The inventive gap services router (GSR) 100 is especially ideal for current/previous users of the Cisco™ 2811 integrated services router (ISR) that are in need of a replacement unit, additional units, or an upgraded solution. The inventive gap services router (GSR) 100 is also an ideal solution for deployable systems (e.g. transportable transit cases), space constrained locations, ship and aircraft systems, and branch offices.

The inventive gap services router (GSR) 100 extends the life of existing housing for deployed department of defense (DoD) routers. Replacement of the legacy Cisco™ 2811 integrated services router (ISR) with the inventive gap services router (GSR) 100 will likely result in significant cost savings to the United States government.

The gap services router (GSR) 100 has particular applicability for use by the United States Department of Defense (DoD), data centers, and small offices.

While the invention has been described with reference to the exemplary embodiments thereof, those skilled in the art will be able to make various modifications to the described embodiments of the invention without departing from the true spirit and scope of the invention.

What is claimed is:

1. A gap services router (GSR), comprising:
an Ethernet router comprising:
   an embedded services router (ESR); and
   an embedded services switch;
   an embedded server including a removable solid state drive (SSD), said embedded server being integrated with said Ethernet router and embedded within said gap services router;
   at least one local area network (LAN) port having power over Ethernet (PoE) capability; and
   at least one wide area network (WAN) port having power over Ethernet (PoE) capability;
   wherein upon removal of said SSD, said SSD is configured to self-erase all data maintained on said SSD and said embedded server is configured to self-erase a portion of data stored on said embedded server associated with said data maintained on said SSD and disable said embedded server while leaving said Ethernet router operational within said GSR.

2. The gap services router (GSR) according to claim 1, wherein:
   non-volatile memory within said server is intentionally erased upon removal of said SSD from said embedded server.

3. The gap services router (GSR) according to claim 1, wherein:
   said Ethernet router includes virtualization capabilities.

4. The gap services router (GSR) according to claim 1, wherein:
   said GSR is one rack unit (RU) in size.

5. The gap services router (GSR) according to claim 1, wherein:
   said GSR is a drop-in replacement for an integrated services router (ISR).

6. The gap services router (GSR) according to claim 1, wherein said embedded server is configured to provide at least two of: internet protocol (IP) capabilities, virtual call processing capabilities, virtual network management capabilities, virtual network operation capabilities, radio over Internet protocol (RoIP) capabilities and logical volume manager capabilities.

* * * * *